United States Patent [19]
Klare

[11] 3,889,390
[45] June 17, 1975

[54] REGENERATED CELLULOSE SOFTENER RECOVERY METHOD AND APPARATUS

[75] Inventor: Robert John Klare, Clinton, Iowa

[73] Assignee: E. I. du Pont de Nemours & Company, Wilmington, Del.

[22] Filed: Oct. 18, 1974

[21] Appl. No.: 515,965

[52] U.S. Cl. ............................ 34/23; 34/27; 34/75; 34/155; 68/18 R
[51] Int. Cl. ............................................. F26b 3/00
[58] Field of Search ............... 34/23, 26, 27, 32, 20, 34/72-78, 155; 68/18 R, 18 C, 19, 20

[56] References Cited
UNITED STATES PATENTS

| | | | |
|---|---|---|---|
| 3,087,254 | 4/1963 | Kubodera | 34/77 |
| 3,538,613 | 11/1970 | Perry | 34/23 |
| 3,561,131 | 2/1971 | Swartz | 34/73 |

*Primary Examiner*—Kenneth W. Sprague
*Assistant Examiner*—James C. Yeung

[57] ABSTRACT

An improvement in a process for continuously and automatically reclaiming a portion of a softening agent used in treating regenerated cellulose film in which the softening agent is absorbed in two steps from an exhaust air stream and returned directly to the film treating step. A separate dilute aqueous solution of softening agent is used as the absorbent in the second absorption step, and a mist eliminator between the absorption steps controls the movement of resin contaminants within the softener recovery apparatus.

8 Claims, 1 Drawing Figure

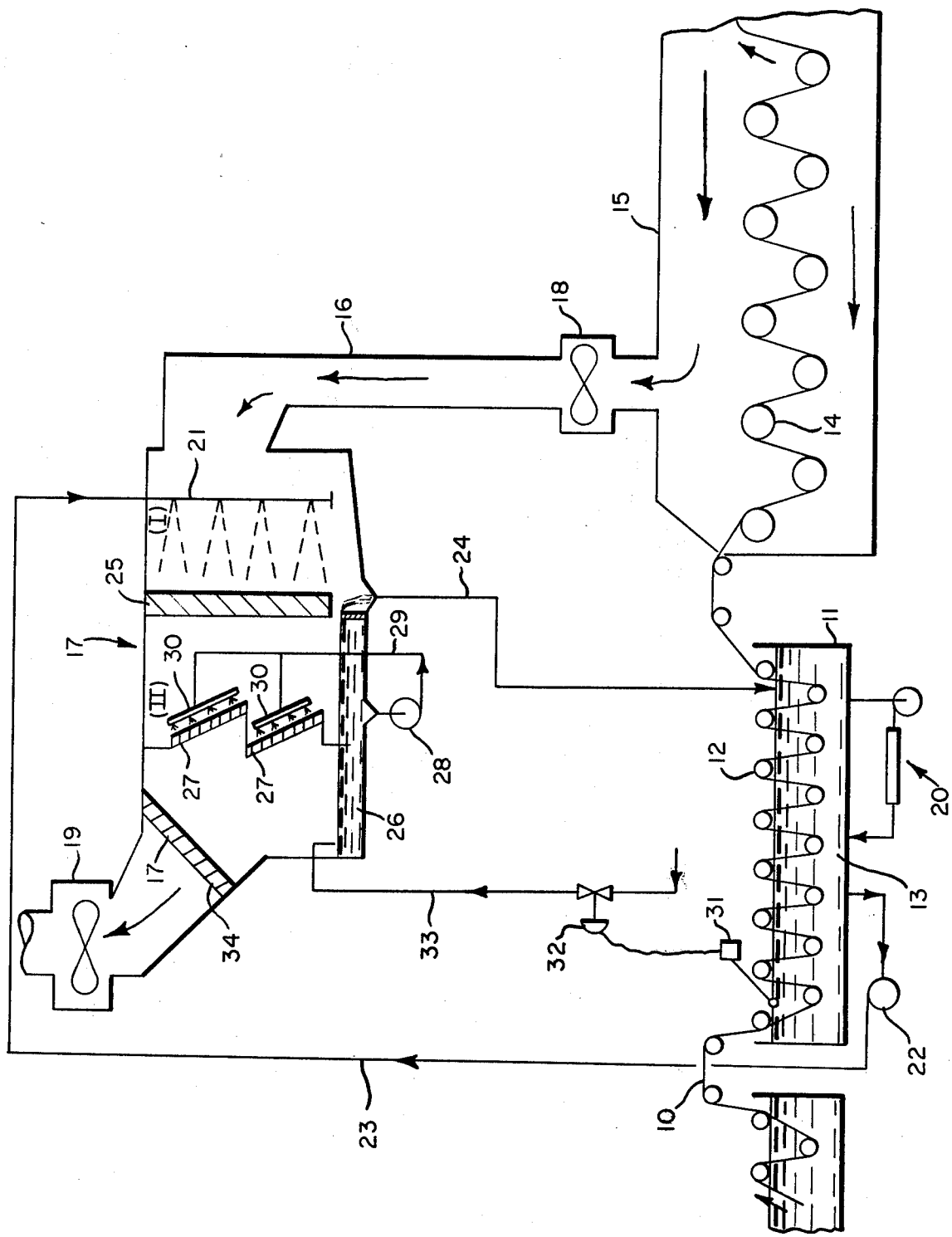

REGENERATED CELLULOSE SOFTENER RECOVERY METHOD AND APPARATUS

BACKGROUND OF THE INVENTION

This invention relates to an improvement in a process for reclaiming a portion of the softening agents used in treating gel regenerated cellulose film and, more particularly, to an improvement in a continuous, automatic process for recovering softening agents by absorption from a film dryer exhaust air stream.

Regenerated cellulose is generally produced by the viscose process in which cellulose pulp is converted to a cellulose xanthate solution. This solution is filtered, evacuated and aged for a number of hours and then extruded through a long, narrow casting die into a sulfuric acid-sodium sulfate bath which first coagulates the cellulose xanthate solution into a coherent web of film and then decomposes the xanthate to produce a moisture-laden, gel-film structure which is then passed through a series of treating baths to wash, desulfurize, bleach and soften the web. Softening is accomplished by passing the web through a treatment bath of a warm solution comprising water plus another ingredient such as glycerine and/or propylene glycol or ethylene glycol as a softening agent. The purified and softened, i.e., plasticized, web is then dried to a moisture content of about 4 to 8% by passing it over a series of heated rolls in a drying chamber through which also passes a counter current stream of heated air.

The gel cellulose film ordinarily contains about 200 to 350 weight percent water when it enters the treating bath. As the film is heated by the warm aqueous softener solution, a substantial amount of this water is released to the solution which causes not only a decrease in the softener solution concentration, but also a substantial increase in the total treating bath volume. To control the volumetric increase it is necessary to continuously purge solution from the treating bath. Occasionally, malfunctions in the purging process result in the bath's overflowing and softening agent being lost as a pollutant to the wastewater system.

In the drying process excess water and softening agent are vaporized and exhausted from the drying chamber by the stream of heated air. A substantial amount of softening agent can be lost from the treating process during the drying step unless positive recovery means are implemented before the stream of air from the drying chamber is exhausted to atmosphere.

The prior art has recognized various methods for preventing the loss of softening agent from the treating process, including, in combination, a method of controlling the concentration of softening agent in the film treating tank. U.S. Pat. No. 3,538,613 to Perry, for example, discloses a softening agent recovery process having a single absorption chamber into which is dispersed a softener solution from a film treating bath as the absorbent. This represents a significant improvement over earlier art which employed many separate recovery steps that contributed greatly to operating expense.

Softener that is absorbed or condensed from the dryer exhaust air stream in the Perry process is returned directly to the film treating tank. It has been found, however, that under optimum operating conditions this system may be expected to remove only a portion, i.e., about 80%, of the softening agent from the dryer exhaust air stream. Furthermore, the liquid-vapor contacting equipment used in the Perry system, i.e., spray nozzles, demister pads and/or seive trays, is subject to pluggage problems which may occur frequently depending upon the system's operating temperature. The pluggage is usually caused by a small amount, about 1% or less, of a resin contaminant, such as urea formaldehyde resin, contained in the softener solution used as the absorbent. The cooling and concentrating effect upon the softener solution caused by the solution passing through the spray nozzles in the area immediately between the spray and the sieve trays may cause the resin to precipitate and plug any small openings in the equipment.

SUMMARY OF THE INVENTION

Accordingly, there is provided in the present invention an improvement in a process for reclaiming a portion of a softening agent used in treating regenerated cellulose film which process includes the steps of:

a. treating gel regenerated cellulose film by moving said film through an aqueous solution of softening agent;

b. drying the film from said treating step (a) by moving said film counter current to an air stream thereby transferring excess water and softening agent from said film to said air stream;

c. absorbing softening agent from the air stream of the drying step (b) by contacting said air stream with a mist of the aqueous solution of softening agent from said treating step (a) and evaporating water from said aqueous solution into said air stream;

d. returning the aqueous solution from said absorbing step (c) to the aqueous solution of said treating step (a);

the improvement of increasing the removal of said softening agent which consists in the additional steps of:

1. removing entrained droplets of aqueous solution from the air stream of the absorption step (c);
2. further absorbing softening agent from the air stream of the preceding step (1) by contacting said air stream with a mist of a separate dilute aqueous solution of softening agent; and
3. adding water to said dilute aqueous solution of softening agent to replace process water losses.

There is further provided in the present invention an improvement in an apparatus for carrying out the abovedescribed process.

The present invention has demonstrated a substantially improved recovery efficiency, removing about 94–97% of the softening agent from the dryer exhaust air stream. At the same time the improvement of this invention overcomes the frequent and detrimental pluggage problems of the prior art.

BRIEF DESCRIPTION OF THE DRAWING

FIG. 1 is a schematic representation of the apparatus for carrying out the improved process of the present invention.

DETAILED DESCRIPTION OF THE INVENTION

Referring now to FIG. 1, gel regenerated cellulose film 10 at a temperature of about 45°C. is continuously guided through a treatment tank 11 by a series of alternating rolls 12. The film 10 is warmed by the treating solution 13, which is an aqueous solution of a film softening agent, such as ethylene glycol or propylene glycol, maintained at a temperature in the range of about 67° to 77°C. Water carried by the gel cellulose web is transferred to the aqueous solution of softening agent 13, reducing the softener concentration and increasing the total solution volume. The treated film 10 is then guided over a series of heated rolls 14 within a drying chamber 15 at a temperature of about 60° to 100°C. Through the drying chamber also passes a counter current stream of heated air at a temperature of about 66° to 94°C. Excess water and softening agent accompanying the treated cellulose web are vaporized and carried by the air stream through a duct 16 to a softening agent recovery apparatus 17 incorporating the improvements of the present invention. Fans 18 and 19 continuously move the softener-laden dryer exhaust air stream from the drying chamber 15 through the softener recovery apparatus 17.

The aqueous solution of softening agent 13 ordinarily contains about 8–12 weight percent propylene glycol and less than 1 weight percent of a resin contaminant such as urea formaldehyde resin. A pump and heat exchanger are arranged in a recirculation loop 20 to automatically control the temperature of the aqueous solution of softening agent at any predetermined setting, most preferably between about 73° and 77°C.

The softener solution 13 is moved from the film treatment tank 11 to a bank of spray nozzles 21 located within absorption section (I) by any suitable arrangement of pumps 22 and piping 23. The pumping rate and the quantity of spray nozzles in the bank will normally depend on the volume of softener-laden air received from the drying chamber 15 and the amount of softening agent to be recovered, which, in turn, will be determined by the quantity of film being treated. Of great importance, however, is that the spray nozzles in bank 21 be arranged so that the softener solution is uniformly dispersed as a mist throughout the entire incoming dryer exhaust air stream. In a preferred embodiment nozzle bank 21 contains 44 "full cone" spray nozzles and receives softener solution at a rate of about 20 gallons/minute.

There is normally a need to remove about 3 pounds/minute of water that has been transferred to the softener solution 13 in the film treatment tank 11 by the gel cellulose film 10 being treated. By dispersing softener solution from the treatment tank into absorption section (I), an amount of water in excess of the normal buildup in the treatment tank is evaporated, ordinarily about 8 to 15 pounds/minute. Simultaneously a substantial amount of softening agent is absorbed and returned directly to the film treatment tank 11 through any suitable return line 24. Under optimum operating conditions an absorption efficiency of about 75 to 80% can be achieved in section (I). Resin contaminant contained in the aqueous solution of softening agent will also precipitate within absorption section (I).

The air stream from absorption section (I), which is now saturated with water and the portion of softening agent not absorbed, moves through a mist eliminator 25 into absorption section (II). The mist eliminator 25 prevents any spray droplets, including softener rich droplets, precipitated resin and other particles, from passing into absorption section (II). In a preferred embodiment a vane-type mist eliminator provides the most satisfactory results.

Absorption section (II) includes a liquid reservoir or sump 26 from which a separate dilute aqueous solution of softening agent is continuously recirculated over absorption media 27. The recirculation of the dilute solution is accomplished by any suitable arrangement of pumps 28 and piping 29 which ordinarily includes one or more banks of spray nozzles 30 of the type used in absorption section (I). Alternatively, nozzles designed for a coarse distribution of liquid can be used. In a preferred embodiment the softening agent concentration of the separate dilute solution varies within the range of about 1 to 3 weight percent softener. As previously described an amount of water in excess of the normal buildup in the film treatment tank 11 is evaporated into the air stream in absorption section (I). The loss of water from the treatment process is indicated by a level control device 31 arranged to sense a change in the level of aqueous solution 13 within the film treatment tank 11. A low or high level signal will be transmitted to an automatic control valve 32 located in water line 33. In response to a low level signal control valve 32 will open adding water to reservoir 26. The reservoir is arranged so that excess solution resulting from the combination of added water and absorbed softening agent will overflow to the film treatment tank 11 to satisfy the level control device 31. When the solution from reservoir 26 is circulated at a rate high enough to remain dilute with respect to condensed softeners, i.e., about 300 gallons/minute, the dryer exhaust air stream can be scrubbed clean of substantially all water soluble impurities.

The absorption media 27 can be any generally recognized absorption material such as sieve trays or a mesh or screen type of material. Perforated plates of the type described in U.S. Pat. No. 3,538,613 to Perry are particularly suited for this application. The absorption material 27 should be mounted within absorption section (II) so that minimum resistance is offered to the moving air stream, preferably at an angle of about 45° to the direction of air flow. This angle also facilitates the collection of liquid droplets in the sump below.

The water-saturated dryer exhaust air stream next passes through a second mist eliminator 34 to remove fine, entrained water droplets prior to the air stream leaving the softener recovery apparatus.

The following specific example further illustrates the improved process and apparatus of this invention.

EXAMPLE

Referring to FIG. 1, approximately 1,000 pounds/minute dry air at about 71°C. (160°F.) containing about 56 pounds/minute water and about 0.7 pounds/minute propylene glycol is exhausted from the cellulose web drying chamber 15 via dryer exhaust fan 18 into the absorption section (I) of the softener recovery apparatus 17. Exhaust fan 19 is used to overcome the pressure drop through the recovery apparatus. On entering absorption section (I) the dryer exhaust air stream passes through a uniformly distributed spray of propylene glycol-water solution pumped directly from film treatment tank 11 through line 23 at a rate of about 20 gallons/minute. This softener solution contains 10 weight percent propylene glycol and a small amount of contaminant, e.g., about 1% polymerized anchorage resin.

The spray from nozzles in bank 21 humidifies the exhaust air stream by evaporating about 14 pounds/minute of water while simultaneously condensing about 0.5 pounds/minute of propylene glycol from the air stream. About an 80% theoretical mass transfer efficiency is obtained through section (I). The plugging of spray nozzles in bank 21 by the resin contaminant is substantially reduced by using hot softener solution, i.e. about 75°C., without cooling. Operating experience indicates that spray nozzles 21 can effectively operate about 2 months before any cleaning is required. However, because of the thorough cleansing action achieved in absorption section (II) using substantially soft water, minor nozzle pluggage in evaporation section (I) has little or no noticeable effect on overall recovery efficiency.

As the dryer exhaust air stream leaves absorption section (I) it passes through a vane-type mist eliminator 25 which removes liquid spray particles from the air including any polymerized resin contaminant, a large portion of which, i.e., about 0.5 pounds/minute (50%) has now precipitated because of the cooling effect of the evaporation process. The liquid and precipitated resin fall to the bottom of section (I) and return to the film treatment tank 11 through line 24.

In absorption section (II) the exhaust air stream passes through at least one perforated absorption plate 27. Simultaneously liquid from a reservoir 26 located within the absorption section is circulated through a bank of spray nozzles 30 and dispersed onto the absorption plate. As the exhaust air passes through the wetted perforations in the absorption plate 27, propylene glycol is absorbed at an efficiency of about 95% of a theoretical mass transfer unit. Water, the absorbent liquid, is added to the reservoir 26 to replace the water losses in the entire system. About 0.18 pounds/minute of absorbed, i.e., condensed, propylene glycol and soft water added to the reservoir, less about 2.5 pounds/minute evaporation loss, overflows the reservoir and is returned directly to the film treatment tank 11. Thus, only about 0.02 pounds/minute of propylene glycol per 1,000 pounds/minute of dryer exhaust air is not recovered. A second mist eliminator 34, comprising a 4 inch thick mesh type demister pad, removes any fine droplets from the air stream as it passes from the softener recovery apparatus 17.

The improvement of the present invention substantially increases the softening agent recovery efficiency and further controls the distribution of resin contaminant within absorption section (I) of the softener recovery apparatus to minimize equipment pluggage. The improved process of this invention is continuous and automatic and easily adaptable to a wide range of film treating rates and softening agents.

What is claimed is:

1. In a process for reclaiming a portion of a softening agent used in treating regenerated cellulose film which process includes the steps of:
   a. treating gel regenerated cellulose film by moving said film through an aqueous solution of softening agent;
   b. drying the film from said treating step (a) by moving said film counter current to an air stream thereby transferring excess water and softening agent from said film to said air stream;
   c. absorbing softening agent from the air stream of the drying step (b) by contacting said air stream with a mist of the aqueous solution of softening agent from said treating step (a) and evaporating water from said aqueous solution into said air stream;
   d. returning the aqueous solution from said absorbing step (c) to the aqueous solution of said treating step (a);

the improvement of increasing the removal of said softening agent which consists in the additional steps of:
   1. removing entrained droplets of aqueous solution and solid contaminants from the air stream of the absorption step (c);
   2. further absorbing softening agent from the air stream of the preceding step by contacting said air stream with a mist of a separate, dilute aqueous solution of softening agent; and
   3. adding water to said dilute aqueous solution of softening agent to replace process water losses.

2. The process as defined in claim 1 wherein said aqueous solution of softening agent contains from about 0 to 1.5 weight percent of a urea-formaldehyde resin, which resin is removed in the droplets of step (1) prior to further absorbing step (2).

3. The process as defined in claim 2 wherein said aqueous solution of softening agent contains about 8 to 12 weight percent softening agent.

4. The process as defined in claim 3 wherein said separate dilute aqueous solution of softening agent contains about 1 to 3 weight percent softening agent.

5. In an apparatus for reclaiming a portion of a softening agent used in treating regenerated cellulose film which comprises:
   a. a tank for containing an aqueous solution of softening agent with means for moving a gel regenerated cellulose film through said tank;
   b. a drying chamber for drying the film from said tank by a stream of air passing therethrough;
   c. means for moving the gel regenerated cellulose film through said drying chamber counter current to said air stream so that excess water and softening agent are transferred from said film to said air stream;
   d. a first absorption chamber for absorbing softening agent from said air stream;
   e. means for moving said air stream from said drying chamber to said first absorption chamber;
   f. means for dispersing a mist of said aqueous solution of softening agent from said tank into said air stream within said first absorption chamber;
   g. means for returning said aqueous solution from said first absorption chamber to said tank;

the improvement which comprises:
   1. a second absorption chamber adjacent said first absorption chamber, said second chamber having means for containing a separate dilute aqueous solution of softening agent;
   2. a mist eliminator between said first absorption chamber and said second absorption chamber to remove droplets of aqueous solution from said air stream;
   3. means for dispersing a mist of said dilute aqueous solution of softening agent from said containing means into said air stream within said second absorption chamber; and
   4. means for adding water to said dilute aqueous solution of softening agent.

6. The apparatus as defined in claim 5 wherein said containing means comprises a reservoir including means for returning excess dilute aqueous solution of softening agent from said reservoir to said tank.

7. The apparatus as defined in claim 6 wherein said mist eliminator is a vane-type mist eliminator.

8. The apparatus as defined in claim 7 wherein said means for dispersing a mist of dilute aqueous solution of softening agent comprises a plurality of full cone spray nozzles.

* * * * *